(12) United States Patent
Lovelace et al.

(10) Patent No.: US 9,849,759 B2
(45) Date of Patent: Dec. 26, 2017

(54) INDEPENDENTLY OPERATING MOTOR VEHICLE DOORS WITH AN ARTICULATING DOOR INTERFACE

(71) Applicant: FORD GLOBAL TECHNOLOGIES, LLC, Dearborn, MI (US)

(72) Inventors: Lorne Joseph Lovelace, Macomb Township, MI (US); Henry W. Hausler, Manchester, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/070,803

(22) Filed: Mar. 15, 2016

(65) Prior Publication Data
US 2017/0267073 A1    Sep. 21, 2017

(51) Int. Cl.
| B60J 5/06 | (2006.01) |
| B60J 5/04 | (2006.01) |
| E06B 3/36 | (2006.01) |
| E06B 7/23 | (2006.01) |
| B60J 10/86 | (2016.01) |

(52) U.S. Cl.
CPC ............ *B60J 5/0477* (2013.01); *B60J 10/86* (2016.02); *E06B 3/362* (2013.01); *E06B 7/23* (2013.01)

(58) Field of Classification Search
CPC . B60J 5/0477; B60J 10/86; E06B 7/23; E06B 3/362
USPC .................. 296/146.11, 146.12, 155, 146.1
See application file for complete search history.

(56) References Cited

U.S. PATENT DOCUMENTS

| 4,930,836 | A | * | 6/1990 | Grinn | ..................... B60J 5/0479 |
| | | | | | 292/DIG. 21 |
| 5,398,988 | A | | 3/1995 | DeRees et al. | |
| 5,632,065 | A | * | 5/1997 | Siladke | ................. B60J 5/0479 |
| | | | | | 16/335 |
| 6,332,641 | B1 | | 12/2001 | Okana | |
| 6,382,705 | B1 | | 5/2002 | Lang et al. | |
| 6,609,748 | B1 | * | 8/2003 | Azzouz | .................. B60J 5/0479 |
| | | | | | 296/146.1 |
| 6,938,303 | B2 | * | 9/2005 | Watson | ................... E05D 3/127 |
| | | | | | 16/247 |
| 7,488,029 | B2 | | 2/2009 | Lechkun et al. | |
| 7,726,756 | B2 | * | 6/2010 | Fu | ......................... F25D 23/069 |
| | | | | | 312/401 |
| 7,918,492 | B2 | | 4/2011 | Elliott et al. | |
| 7,950,109 | B2 | | 5/2011 | Elliott et al. | |
| 7,950,719 | B2 | | 5/2011 | Elliott et al. | |
| 8,167,389 | B2 | * | 5/2012 | Han | ......................... F25D 23/02 |
| | | | | | 16/250 |
| 8,297,689 | B2 | * | 10/2012 | Konchan | ............... B60J 5/0479 |
| | | | | | 296/202 |
| 8,342,592 | B2 | * | 1/2013 | Konchan | ............... B60J 5/0479 |
| | | | | | 16/334 |

(Continued)

*Primary Examiner* — Jerry Redman
(74) *Attorney, Agent, or Firm* — Jason Rogers; King & Schickli, PLLC (57) ABSTRACT

A door system is provided for a motor vehicle. That door system includes (a) a first independently operable first, door, (b) an independently operable second door, (c) an articulating door interface carried on the first door and (d) a guide on the motor vehicle body. The guide displaces the articulating door interface between a door sealing position when the first door is closed and a door opening position when the first door is opened. A related method is also provided.

10 Claims, 9 Drawing Sheets

(56) References Cited

U.S. PATENT DOCUMENTS

| | | | |
|---|---|---|---|
| 9,045,025 B1 | 6/2015 | Greene et al. | |
| 2005/0046319 A1* | 3/2005 | Chekal | F25D 11/02 312/401 |
| 2007/0257589 A1* | 11/2007 | Laible | F25D 23/02 312/405 |
| 2009/0072582 A1* | 3/2009 | Elliott | E05C 17/203 296/146.11 |
| 2009/0113927 A1* | 5/2009 | Laible | E05B 65/0042 62/449 |
| 2009/0273264 A1* | 11/2009 | Butler | F25D 23/028 312/405 |
| 2010/0171336 A1* | 7/2010 | Elliott | B60J 5/06 296/146.12 |
| 2012/0073321 A1 | 3/2012 | Davis et al. | |
| 2014/0159560 A1* | 6/2014 | Jung | F25D 23/028 312/405 |
| 2014/0268648 A1* | 9/2014 | Gomes | F25D 27/005 362/94 |
| 2016/0178268 A1* | 6/2016 | Jung | E05F 1/10 312/404 |

\* cited by examiner

INDEPENDENTLY OPERATING MOTOR VEHICLE DOORS WITH AN ARTICULATING DOOR INTERFACE

TECHNICAL FIELD

This document relates generally to the motor vehicle equipment field and, more particularly, to a door system including independently operating motor vehicle doors with an articulating door interface.

BACKGROUND

It is known in the art to provide a pillarless opening in a body of a motor vehicle that is closed by a forward hinged front door and a rearward hinged rear door. The rear door of such a structure incorporates a static door interface or pillar. As a consequence of such a design, the front door must be opened in order to provide clearance for opening the rear door. Further, the rear door must be closed to provide the pillar in the closed position before closing the front door. As such, the two doors are not independently operable.

This document relates to a new and improved door system for a motor vehicle incorporating an articulating door interface or pillar carried on one of the doors. Advantageously, such a system provides all the access advantages of a pillarless opening in the body of a motor vehicle while also allowing independent operation of the front and rear doors. Thus, the front door may be opened and closed without operating the rear door and the rear door may be opened and closed without operating the front door. As such, the door system set forth in this document represents a significant advance in the art.

SUMMARY

In accordance with the purposes and benefits described herein, a door system is provided for closing a pillarless opening in a motor vehicle body. That door system includes an independently operating first door, an independently operating second door, an articulating door interface carried on the first door and a guide on the motor vehicle body displacing the articulating door interface between a door sealing position when the first door is closed and a door opening position when the first door is opened.

The articulating door interface may include an elongated body having a first pivot connection to the first door at a first end and a second pivot connection to the first door at a second end. Further, the guide may include a first guide element adjacent a top of the pillarless opening and a second guide element adjacent a bottom of the pillarless opening.

Still further, a first guide pin may be carried on the articulating door interface at the first end and a second guide pin may be carried on the articulating door interface at the second end. The articulating door interface pivots about a pivot axis defined by the first pivot connection and the second pivot connection while the first guide pin and second guide pin are offset from that pivot access.

Still further, the first guide element may include a first arcuate slot having a first open end for receiving the first guide pin when the first door is closed. Similarly, the second guide element may include a second arcuate slot having a second open end for receiving the second guide pin when the first door is closed. Still further, the articulating door interface may have a substantially T-shaped cross section.

In addition, the door system may further include a sealing system for sealing the first door and the second door with the articulating door interface when the first door and the second door are closed and the articulating door interface is in the door sealing position. That sealing system may include a first seal carried on the articulating door interface which seals against the first door and the second door when the articulating door interface is in the door sealing position and the first and second doors are closed.

Further, the sealing system may include a second seal and a third seal on the first door for sealing around a first included angle of the substantially T-shaped articulating door interface when the articulating door interface is in the door sealing position and the first door and the second door are closed. Still further, the sealing system may also include a fourth seal and a fifth seal on the second door for sealing around a second included angle of the articulating door interface when the articulating door interface is in the door sealing position and the first door and the second door are closed.

In accordance with an additional aspect a method is provided for closing a pillarless opening in a body of a motor vehicle. That method comprises the steps of: closing the pillarless opening with a first door and a second door carried on the body and displacing an articulating door interface carried on the first door into a door sealing position when the first door is closed and into a door opening position when the first door is opened. The method may include sealing between the articulating door interface, the first door and the second door when the first door and the second door are closed and the articulating door interface is in the door sealing position. Further, the method may include the step of allowing the first door and the second door to be opened and closed independently of one another.

In the following description, there are shown and described several preferred embodiments of the door system and related method. As it should be realized, the door system and related method are capable of other, different embodiments and their several details are capable of modification in various, obvious aspects all without departing from the door system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the door system and related method and together with the description serve to explain certain principles thereof. In the drawing figures.

Reference will now be made in detail to the present preferred embodiments of the door system, examples of which are illustrated in the accompanying drawing figures.

DETAILED DESCRIPTION

Figure 1A:
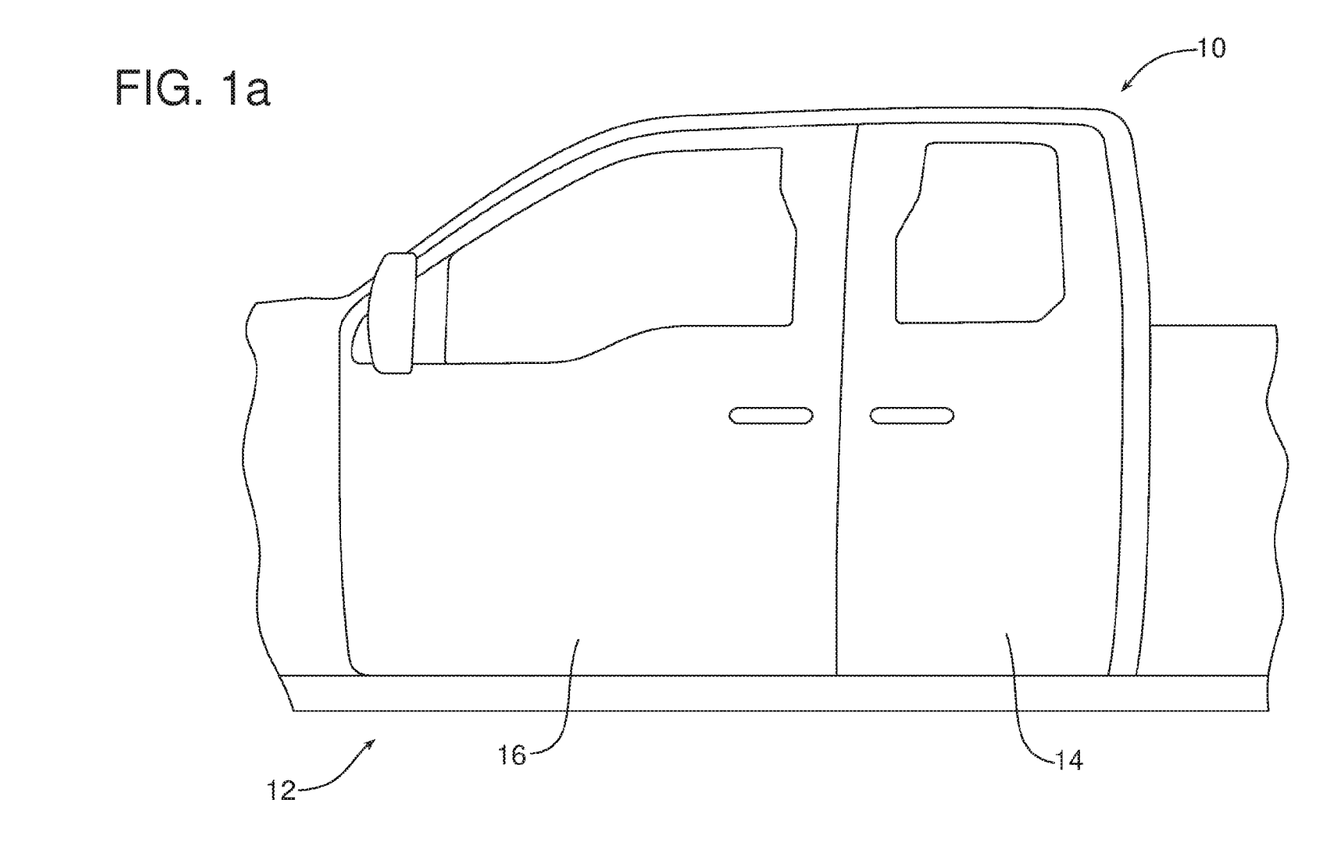
FIG. 1a is a side elevational view of a motor vehicle equipped with the door system with both doors in the closed position.
Figure 1B:
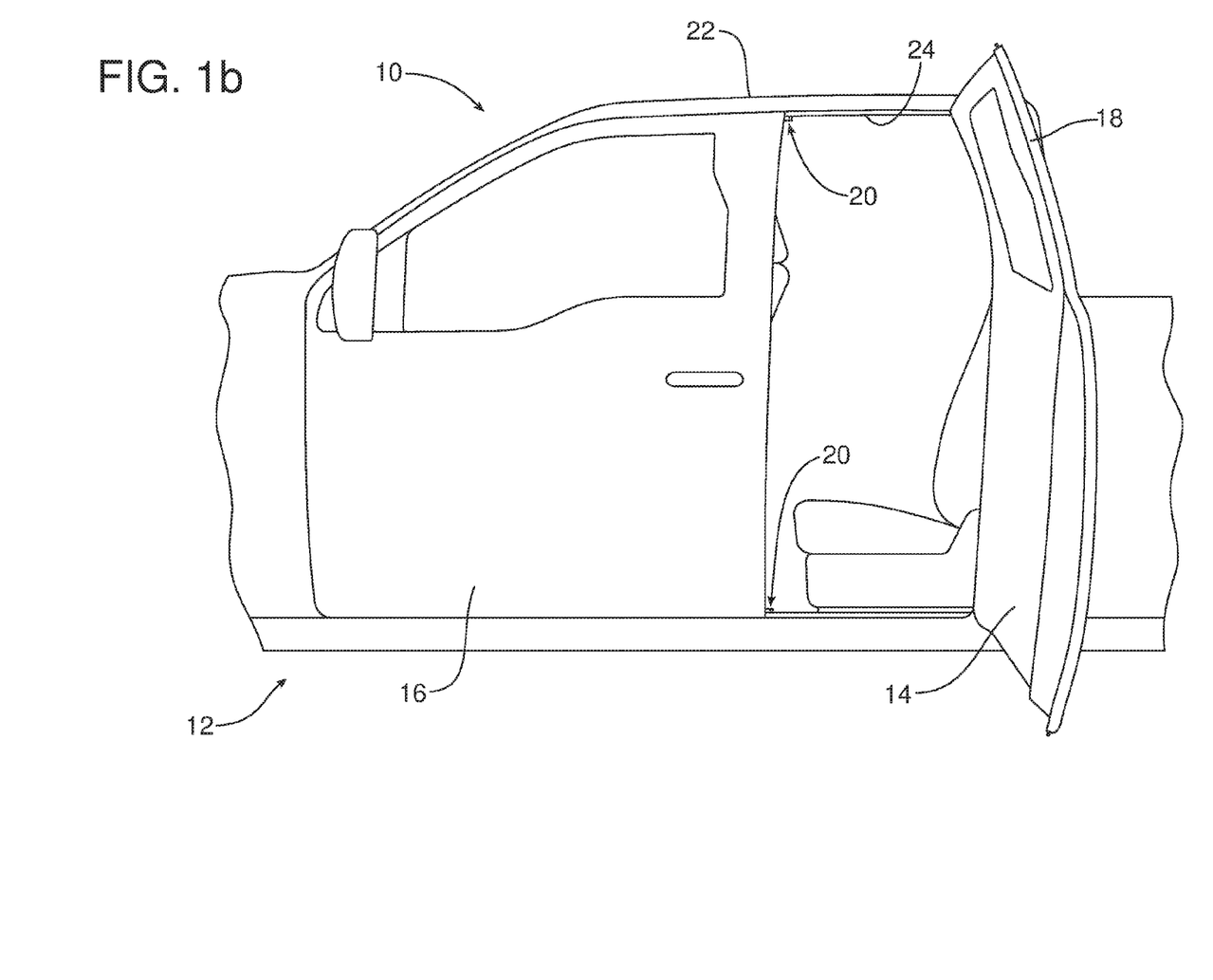
FIG. 1b is a side elevational view similar to FIG. 1a but showing the front door closed and the rear door opened with the articulating door interface on the rear door pivoted or displaced into the door opened position.
Figure 1C:
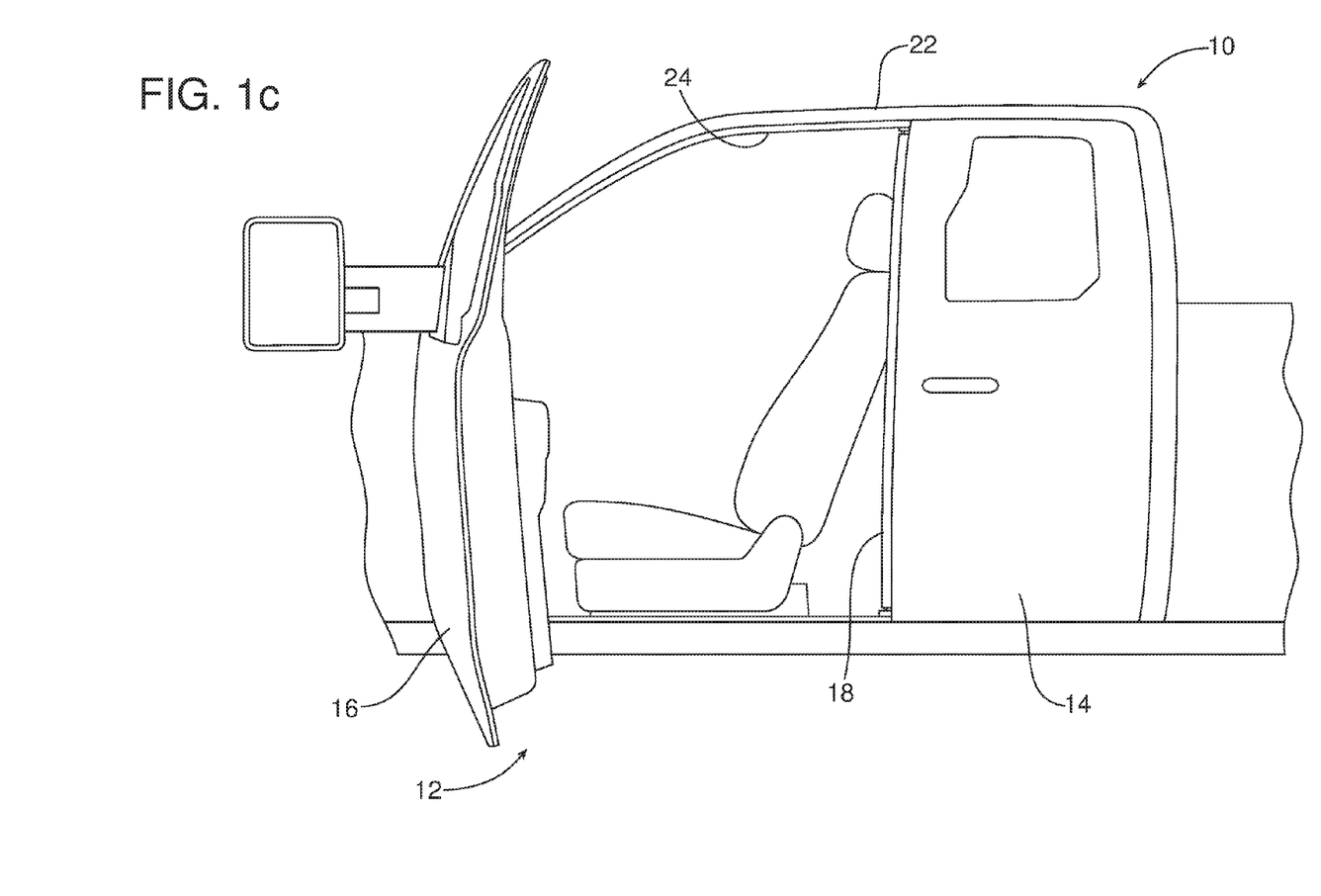
FIG. 1c is a side elevational view similar to FIGS. 1a and 1b wherein the rear door is closed and the front door is open showing the articulating door interface pivoted into the door sealing position.
Figure 1D:
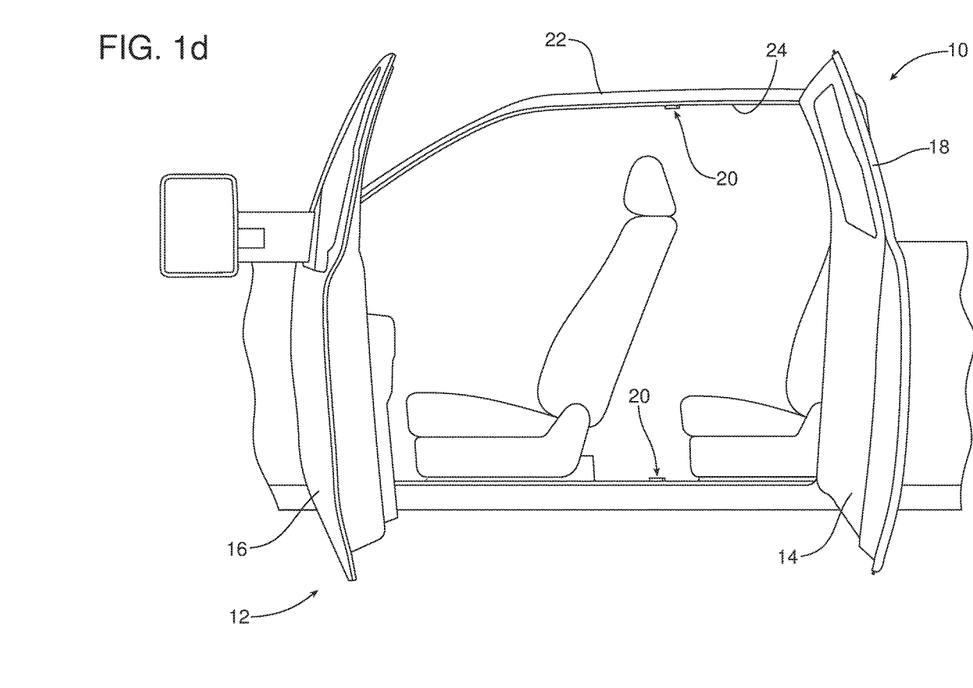
FIG. 1d is a view similar to FIGS. 1a-1c but illustrating both of the front and rear doors in the opened position and a single, uninterrupted or pillarless opening in the side of the motor vehicle body.

Reference is now made to FIGS. 1a-1d illustrating a motor vehicle 10 equipped with the door system 12 that is the subject matter of this document. As should be appreciated from viewing FIGS. 1a-1d, the door system 12 incorporates a first door 14, a second door 16, an articulating door interface or pillar 18 carried on the first door and a guide 20 on the motor vehicle body 22. As will be appreciated from the following description, the guide displaces the articulating door interface 18 between a door sealing position (illustrated in FIGS. 1c, 3, 5 and 6) when the first door is closed and a door open position (illustrated in FIGS. 1b and 4) when the first door is opened. Thus, as illustrated in FIG. 1b, the first or rear door 14 may be independently opened while the second or front door is closed. Alternatively, as illustrated in FIG. 1c, the second or front door 16 may be opened while the first or rear door 14 is closed. Further, as illustrated in FIG. 1d, both doors 14, 16 may be opened to provide enhanced access to the interior of the motor vehicle through pillarless opening 24 in the motor vehicle body 22. As should be appreciated, from viewing FIGS. 1a-1d, the first or rear door 14 is hinged rearward while the second or front door 16 is hinged forward. Further, the first and second doors 14, 16 may also be independently closed.

Figure 2:
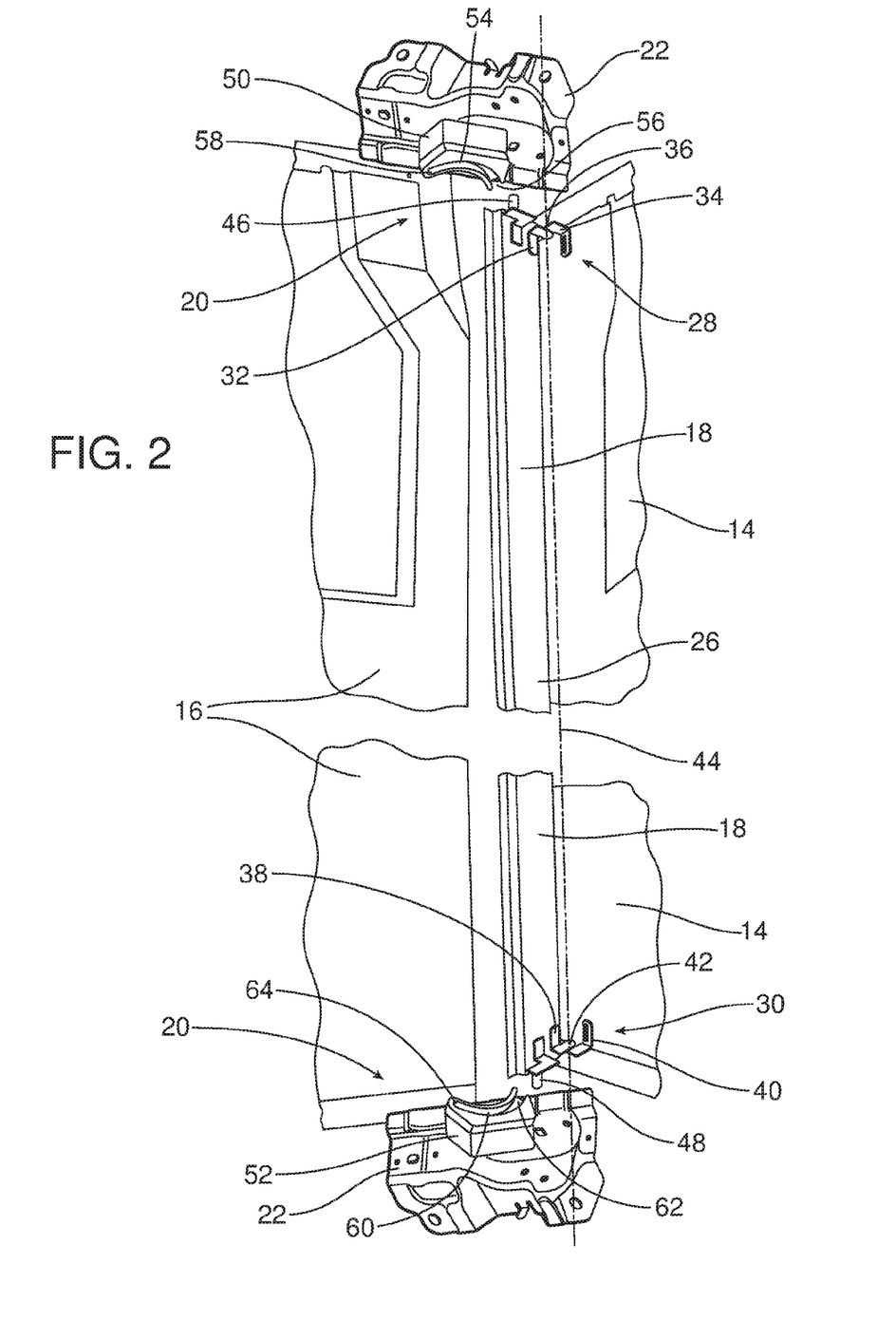
FIG. 2 is a partially exploded, schematic view illustrating the door system including the first and second guide elements provided at the top and bottom of the pillarless opening, the first and second guide pins provided at the first or top end and second or bottom end of the articulating door interface carried on the rear door and the first and second pivot connections pivotally mounting the articulating door interface to the rear door.
Figure 3:
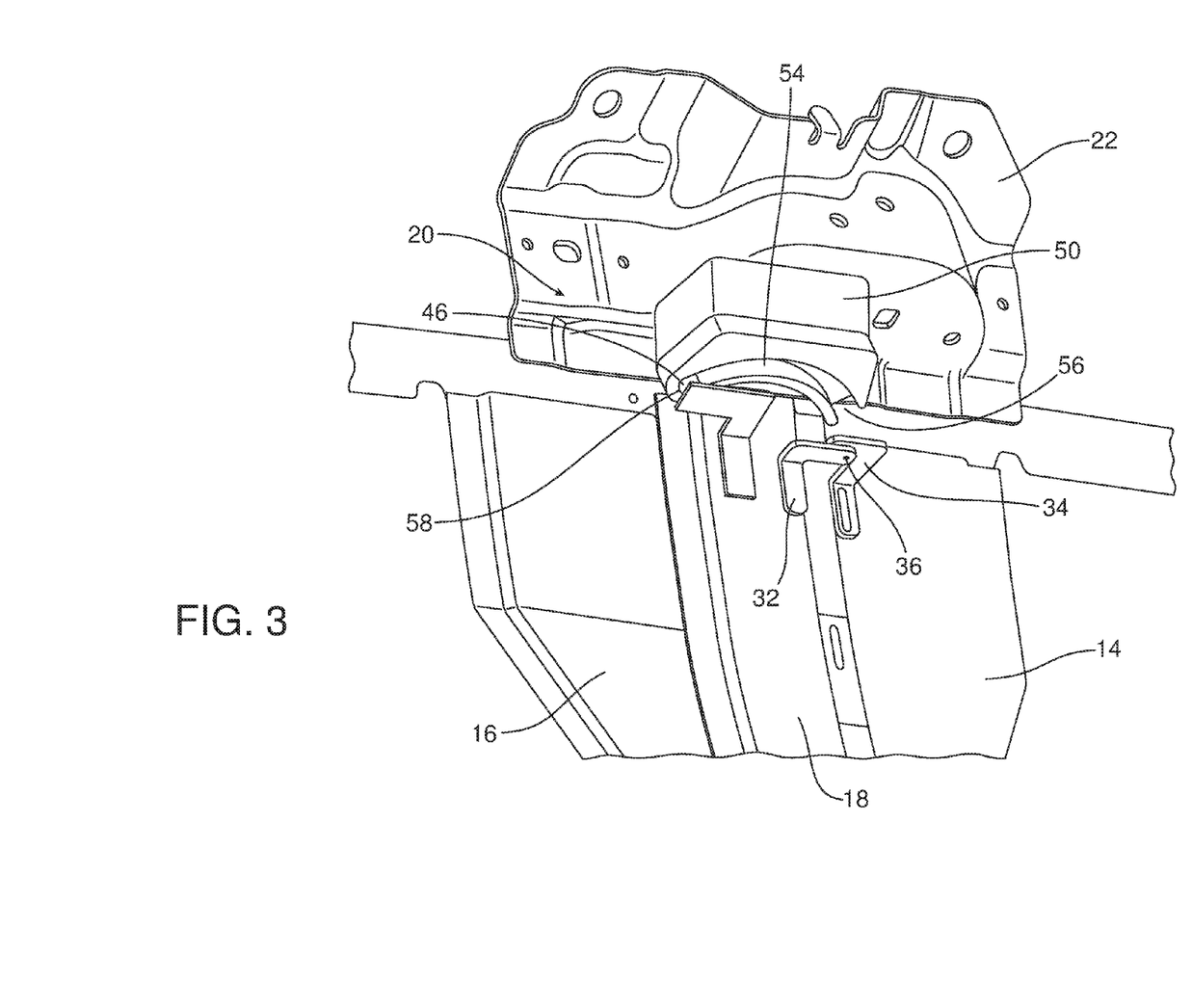
FIG. 3 is a detailed perspective view illustrating the first guide element, the first pivot connection of the articulating door interface to the first or rear door and the articulating door interface in the door sealing position with the first and second doors closed.
Figure 4:
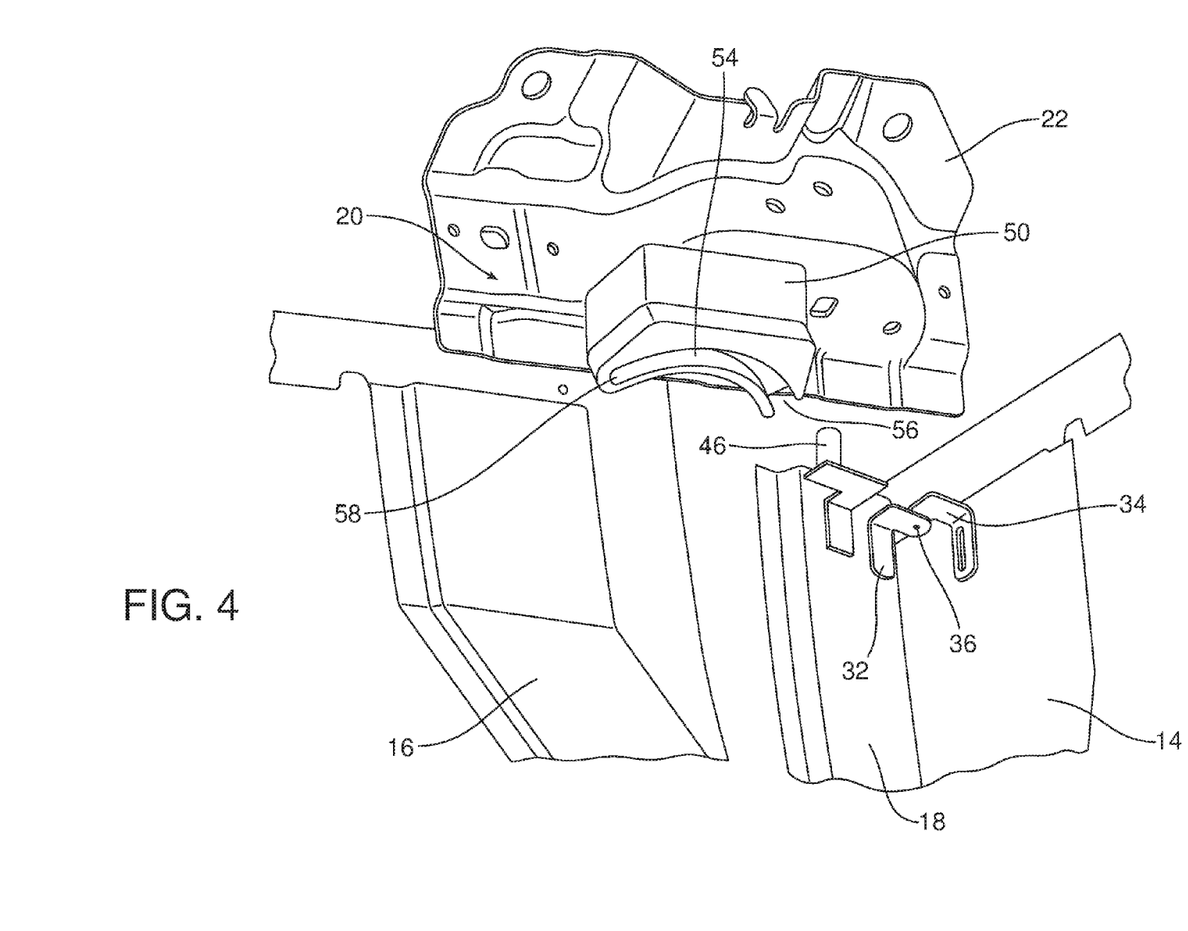
FIG. 4 is a view similar to FIG. 3 but showing the first rear door opened and the articulating door interface rotated or pivoted into the door opened position.
Figure 5:
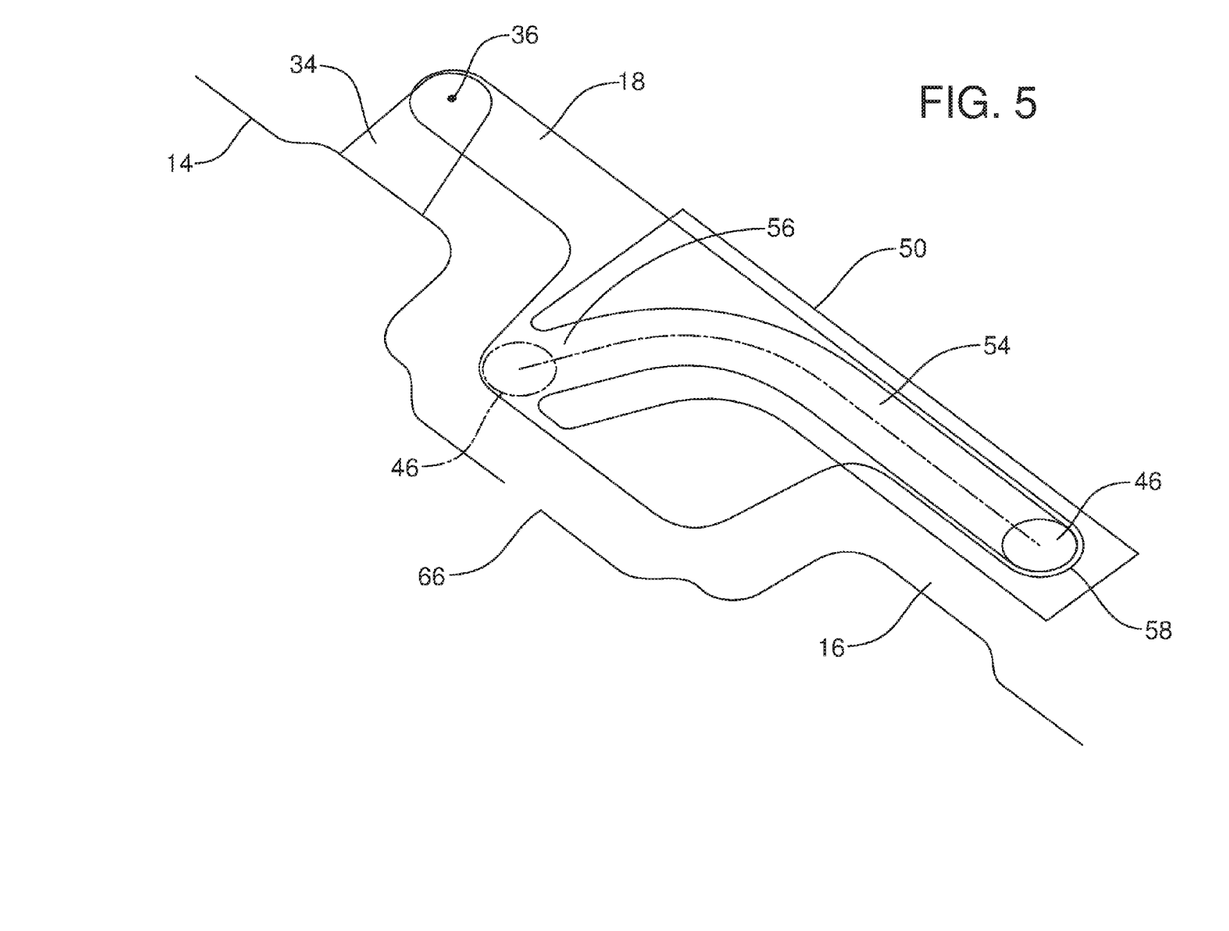
FIG. 5 is a schematic illustration showing the orientation of the various components of the door system when the articulating door interface is in the door sealing position and the first and second doors are closed.
Figure 6:
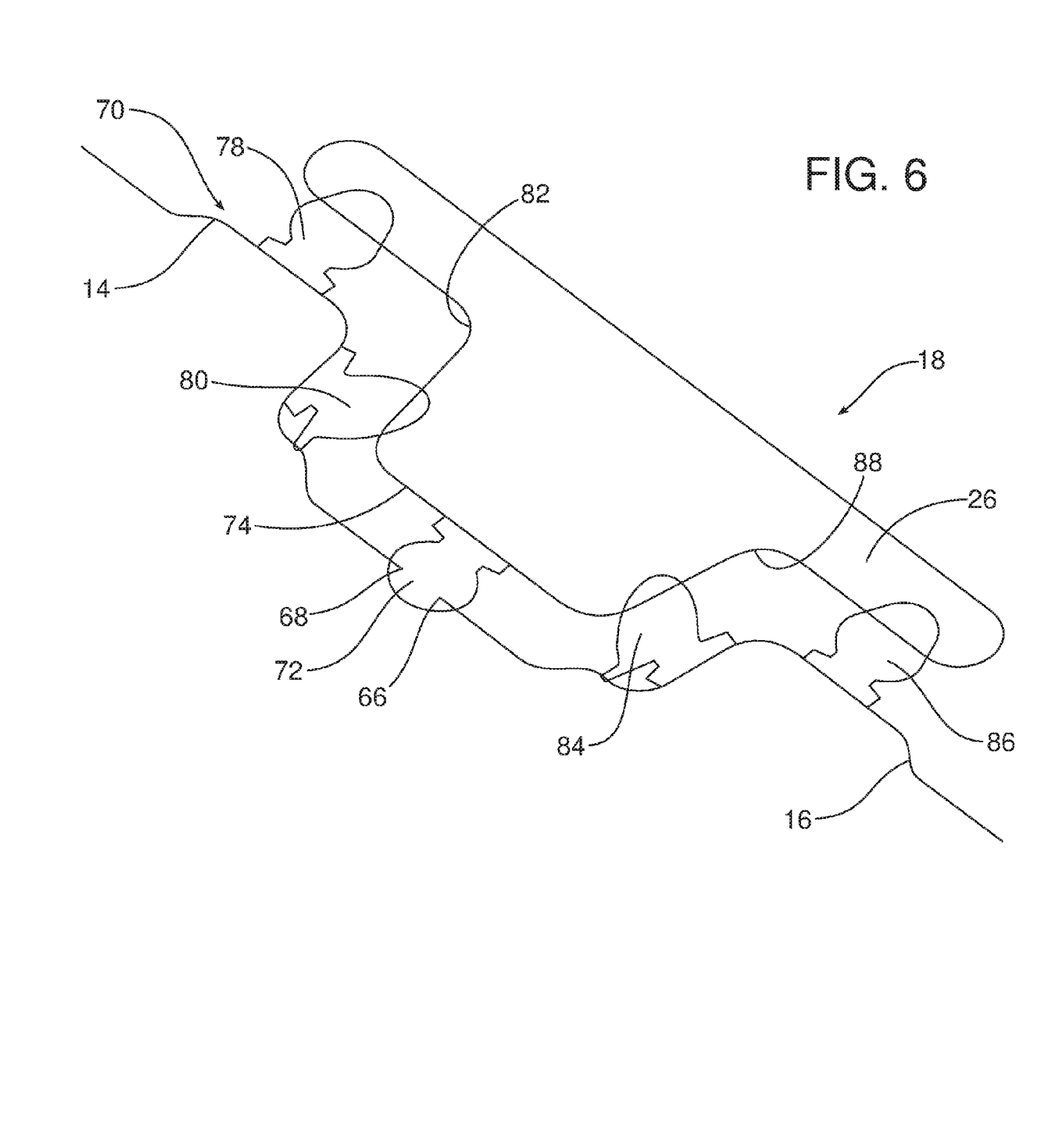
FIG. 6 is a schematic illustration of the sealing system illustrating how the five seals of the sealing system provide sealing between the articulating door interface, the first door and the second door when the articulating door interface is in the door sealing position and the first and second doors are closed.

As best illustrated in FIGS. 2 and 6, the articulating door interface 18 has an elongated body 26 with a substantially T-shaped cross section. The elongated body 26 has a first pivot connection 28 to the first door 14 at a first or upper end and a second pivot connection 30 to the first door at a second or lower end. As best illustrated in FIGS. 2 and 3, the first pivot connection 28 comprises a first lug 32 on the articulating door interface 18, a second lug 34 on the first door 14 and a pivot pin 36 connecting the two lugs 32, 34. Similarly, the second pivot connection 30 includes a third lug 38 on the articulating door interface 18 and a fourth lug 40 on the first door 14 connected together by means of a pivot pin 42. The first and second pivot connections 28, 30 and, more particularly, the pivot pins 36, 42 thereof, define a pivot axis 44 about which the articulating door interface 18 pivots and is displaced between the door sealing position and the door opening position with respect to the first door 14.

As further illustrated in FIGS. 2 and 3, a first guide pin 46 is carried on the articulating door interface 18 at the first end while a second guide pin 48 is carried on the articulating door interface at the second or lower end. As should be appreciated, the two guide pins 46, 48 are offset toward the second or front door 16 from the pivot axis 44 defined by the pivot pins 36, 42.

As further illustrated in FIGS. 2 and 3, the guide 20 includes a first guide element 50 adjacent a top of the pillarless opening 24 on the motor vehicle body 22 and a second guide element 52 adjacent a bottom of the pillarless opening on the motor vehicle body. In the illustrated embodiment, the first guide element 50 includes a first arcuate slot 54 having a first open end 56 oriented toward the first door 14 and a second, closed end 58 oriented toward the second door 16. Similarly, the second guide element 52 includes a second arcuate slot 60 having a second open end 62 oriented toward the first door 14 and a second closed end 64 oriented toward the second door 16. As should be appreciated, when the first door 14 is closed, the first guide pin 46 is received in the first arcuate slot 54 adjacent the closed end 58 while the second guide pin 48 is received in the second arcuate slot 69 adjacent the closed end 64. When the first door 14 is then opened, the first and second guide pins 46, 48 slide through the respective first and second arcuate slots 54, 60 from the respective closed ends 58, 64 toward and through the respective open ends 56, 62. As this occurs, the articulating door interface 18 is displaced from the door sealing position to the door opening position. If the second or front door 16 is closed when the first or rear door 14 is opened, this displacement of the articulating door interface 18 moves the articulating door interface around the rearmost edge 66 of the front or second door 16 providing the necessary clearance to allow the closing or opening of the first door independent of the position of the second door.

In contrast, when the first door 14 is closed, the first and second guide pins, 46, 48 on the articulating door interface 18 pass through the aligned respective open ends 56, 62 of the respective first and second arcuate slots 54, 60 and then move through those slots to the respective closed ends 58, 64. As this is done, the articulating door interface 18 is pivoted from the door opening position to the door sealing position. If the second door 16 is closed at that time, it should be appreciated that the articulating door interface 18 is moved around the rear edge of the front or second door providing the necessary clearance to allow the closing of the first door even when the second door is already closed. As should be appreciated, the front door 14 may also be independently opened and closed regardless of the position of the first or rear door 14.

Reference is now made to FIG. 6 clearly illustrating the sealing system 70 incorporated into the door system 12. That sealing system 70 seals the first door 14 and the second door 16 with the articulating door interface 18 when the first and second doors are closed and the articulating door interface is in the door sealing position.

More specifically, the sealing system 70 includes a first seal 72 carried at the end of the central leg 74 of the T-shaped articulating door interface 18 where it is oriented to seal against the first door 14 and second door 16 when the articulating door interface is in the door sealing position and the first and second doors are closed. In particular, note how the seal 72 engages at the rear edge 66 of the front door 16 and the front edge 68 of the rear door 14 thereby sealing the opening between the closed doors.

As further illustrated in FIG. 6, the sealing system also includes a second seal 78 and a third seal 80 on the first door 14 for sealing around a first included angle 82 of the articulating door interface 18 when the articulating door interface is in the door sealing position and the first and second doors are closed.

The sealing system 70 also includes a fourth seal 84 and a fifth seal 86 on the second door 16 for sealing around a second included angle 88 of the articulating door interface 18 when the articulating door interface is in the door sealing position and the first and second doors are closed.

As should be appreciated from the foregoing, a method of closing a pillarless opening 24 in a motor vehicle body 22 is provided. That method may be described as comprising the steps of closing the pillarless opening 24 with a first door 14 and a second door 16 carried on the body 22 and displacing an articulating door interface 18 carried on the first door into a door sealing position when the first door is closed and into a door opened position when the first door is opened.

As should be further appreciated, that method may also include the step of sealing the articulating door interface 18, the first door 14 and the second door 16 when the first door and the second door are closed and the articulating door interface is in the door sealing position. Further, the method may include the step of allowing the first door 14 and the second door 16 to be opened and closed independently of one another while advantageously providing excellent sealing of the pillarless opening 24 when the doors are closed and unrestricted access to the interior of the motor vehicle through the pillarless opening when the doors are opened.

The foregoing has been presented for purposes of illustration and description. It is not intended to be exhaustive or to limit the embodiments to the precise form disclosed. Obvious modifications and variations are possible in light of the above teachings. For example, while not illustrated or described above, the articulating door interface 18 may be spring loaded and biased to pivot about the pivot axis 44 toward the door opening position. Such a feature would assist in moving the articulating door interface 18 around the leading edge of the second door 16 if that door is closed when the first door 14 is opened. Further, such a feature would reduce chucking in the closed position.

All such modifications and variations are within the scope of the appended claims when interpreted in accordance with the breadth to which they are fairly, legally and equitably entitled.

What is claimed:

1. A door system for closing a pillarless opening in a motor vehicle body, comprising:
   a first door;
   a second door;
   an articulating door interface carried on said first door;
   a guide on said motor vehicle body displacing said articulating door interface between a door sealing position when said first door is closed and a door opening position when said first door is opened; and
   a sealing system sealing said first door and said second door with said articulating door interface when said first door and said second door are closed and said articulating door interface is in said door sealing position, wherein said sealing system includes: (i) a first seal carried on said articulating door interface which seals against said first door and said second door when said articulating door interface is in said door sealing position and said first door and said second door are closed; (ii) a second seal; and (iii) a third seal on said first door for sealing around a first included angle of said articulating door interface when said articulating door interface is in said door sealing position and said first door and said second door are closed.

2. The door system of claim 1, wherein said articulating door interface includes an elongated body having a first pivot connection to said first door at a first end and a second pivot connection to said first door at a second end.

3. The door system of claim 2, wherein said guide includes a first guide element adjacent a top of said pillarless opening and a second guide element adjacent a bottom of said pillarless opening.

4. The door system of claim 3, further including a first guide pin carried on said articulating door interface at said first end and a second guide pin carried on said articulating door interface at said second end.

5. The door system of claim 4, wherein (a) said articulating door interface pivots about a pivot axis defined by said first pivot connection and said second pivot connection and (b) said first guide pin and said second guide pin are offset from said pivot axis.

6. The door system of claim 5, wherein said first guide element includes a first arcuate slot having a first open end for receiving said first guide pin when said first door is closed.

7. The door system of claim 6, wherein said second guide element includes a second arcuate slot having a second open end for receiving said second guide pin when said first door is closed.

8. The door system of claim 7, wherein said articulating door interface is substantially T-shaped in cross section.

9. The door system of claim 1, wherein said guide includes a first guide element adjacent a top of said pillarless opening and a second guide element adjacent a bottom of said pillarless opening.

10. The door system of claim 1, wherein said sealing system includes a fourth seal and a fifth seal on said second door for sealing around a second included angle of said articulating door interface where said articulating door interface is in said door sealing position and said first door and said second door are closed.

* * * * *